US011333368B2

(12) United States Patent
Yan et al.

(10) Patent No.: US 11,333,368 B2
(45) Date of Patent: May 17, 2022

(54) FLOOR-STANDING AIR CONDITIONER

(71) Applicant: GD MIDEA AIR-CONDITIONING EQUIPMENT CO., LTD., Guangdong (CN)

(72) Inventors: Changlin Yan, Guangdong (CN); Liangrui Chen, Guangdong (CN); Hongliang Yuan, Guangdong (CN)

(73) Assignee: GD MIDEA AIR-CONDITIONING EQUIPMENT CO., LTD., Guangdong (CN)

( * ) Notice: Subject to any disclaimer, the term of this patent is extended or adjusted under 35 U.S.C. 154(b) by 316 days.

(21) Appl. No.: 16/497,499

(22) PCT Filed: Jun. 25, 2018

(86) PCT No.: PCT/CN2018/092681
§ 371 (c)(1),
(2) Date: Sep. 25, 2019

(87) PCT Pub. No.: WO2019/148750
PCT Pub. Date: Aug. 8, 2019

(65) Prior Publication Data
US 2020/0063985 A1 Feb. 27, 2020

(30) Foreign Application Priority Data

Jan. 30, 2018 (CN) .......................... 201810091057.5
Jan. 30, 2018 (CN) .......................... 201820174493.4

(51) Int. Cl.
*F24F 1/0358* (2019.01)
*F24F 1/005* (2019.01)
(Continued)

(52) U.S. Cl.
CPC .............. *F24F 1/022* (2013.01); *F24F 1/005* (2019.02); *F24F 1/0014* (2013.01);
(Continued)

(58) Field of Classification Search
CPC .... F24F 1/037; F24F 2006/008; F24F 1/0087; F24F 6/04; F24F 13/14; F24F 1/0014;
(Continued)

(56) References Cited

U.S. PATENT DOCUMENTS 6,427,454 B1   8/2002   West

FOREIGN PATENT DOCUMENTS

| CN | 101310830 A | 11/2008 |
|---|---|---|
| CN | 203132000 U | 8/2013 |

(Continued)

OTHER PUBLICATIONS

Decision of Refusal dated Jul. 6, 2021 received in Japanese Patent Application No. JP 2019-552123 together with an English language translation.

(Continued)

*Primary Examiner* — Lionel Nouketcha
(74) *Attorney, Agent, or Firm* — Scully Scott Murphy & Presser

(57) ABSTRACT

An air duct switching component having an air outlet cover defining an air inlet, a first air outlet and a second air outlet, and being arranged such that the air inlet communicates with a fan air outlet; and an air switching plate disposed on the air outlet cover, configured to move between a first position to close the first air outlet and to open the second air outlet and a second position to open the first air outlet and to close the second air outlet, and wherein in the first position, the fan air outlet communicates with a body air outlet via the air inlet and the second air outlet, and wherein the first air outlet is disposed relative to a humidifier such that in the second position, the fan air outlet communicates with the body air outlet via the air inlet, the first air outlet and the humidifier.

12 Claims, 10 Drawing Sheets

(51) Int. Cl.
*F24F 1/037* (2019.01)
*F24F 1/0014* (2019.01)
*F24F 11/00* (2018.01)
*F24F 1/022* (2019.01)
*F24F 1/0033* (2019.01)

(52) U.S. Cl.
CPC ............ *F24F 1/0033* (2013.01); *F24F 1/037* (2019.02); *F24F 1/0358* (2019.02); *F24F 11/0008* (2013.01)

(58) Field of Classification Search
CPC .. F24F 11/81; F24F 11/72; F24F 11/84; F24F 1/0011
See application file for complete search history.

(56) References Cited

FOREIGN PATENT DOCUMENTS

| | | |
|---|---|---|
| CN | 203323264 U | 12/2013 |
| CN | 107218663 A | 9/2017 |
| CN | 107327937 A | 11/2017 |
| CN | 107327944 A | 11/2017 |
| CN | 108105881 A | 6/2018 |
| CN | 207962892 U | 10/2018 |
| JP | S50-022637 U | 6/1975 |
| JP | S53-001955 U | 6/1976 |
| JP | H07-35371 A | 2/1995 |
| JP | 2002-066251 A | 3/2002 |
| JP | 2002-106969 A | 4/2002 |
| JP | 2002106969 A * | 4/2002 |
| JP | 2009-257632 A | 11/2009 |
| JP | 2011-12856 A | 1/2011 |
| JP | 2012-068005 A | 4/2012 |
| JP | 2013-068352 A | 4/2013 |
| JP | 2015-145737 A | 8/2015 |
| JP | 2016-027299 A | 2/2016 |
| JP | 2016-205663 A | 12/2016 |
| JP | 2017-20710 A | 1/2017 |
| JP | 2017-053576 A | 3/2017 |

OTHER PUBLICATIONS

First Office Action dated Jun. 21, 2019 issued in Chinese Patent Application No. 201810091057.5.
Notification of Reason for Refusal dated Sep. 23, 2020 received in Korean Patent Application No. KP 10-2019-7029797 together with an English language translation.
Notice of Reasons for Refusal dated Nov. 4, 2020 received in Japanese Patent Application No. JP 2019-552123 together with an English language translation.
Extended European Search Report dated Jan. 19, 2021 received in European Patent Application No. EP 18904311.0.
Notification of the Second Office Action dated Mar. 25, 2020 received in Chinese Patent Application No. CN 201810091057.5 together with an English language translation.
International Search Report dated Sep. 4, 2018 issued in PCT/CN2018/092681.
Notification of Reason for Refusal dated Mar. 26, 2021 received in Korean Patent Application No. KR 10-2019-7029797 together with an English language translation.

* cited by examiner

FLOOR-STANDING AIR CONDITIONER

CROSS-REFERENCE TO RELATED APPLICATIONS

The subject application is a national stage entry of PCT International Application No. PCT/CN2018/092681, filed on Jun. 25, 2018, where PCT International Application No. PCT/CN2018/092681 claims priority to Chinese Patent Application No. CN 201820174493.4, filed on Jan. 30, 2018 and Chinese Patent Application No. CN 201810091057.5, filed on Jan. 30, 2018, the entire disclosure of each of PCT International Application No. PCT/CN2018/092681, Chinese Patent Application No. CN 201820174493.4 and Chinese Patent Application No. CN 201810091057.5 is incorporated by reference for all purposes. No new matter has been introduced.

FIELD

The present invention relates to the field of air conditioner manufacture, particularly to a floor-standing air conditioner.

BACKGROUND

Currently, people pay more and more attention to the quality of air, and as an important factor to harm our health, indoor air pollution has been given priority to the improvement of air quality. Air cleaning facility is gradually popularizing in the market, and in most cases, an air cleaner is purchased and used after people move into a house, due to the lack of air volume, it is difficult to achieve purification of the whole house. Therefore, it is a better feasible solution if air purification can be integrated with an indoor unit of an air conditioner. However, if a humidifying device is directly added on a panel of the indoor unit of an air conditioner, the operating performance of the air conditioner is greatly affected, specifically speaking, the volume of the inlet/outlet air is affected, resulting in low temperature regulation performance and low efficiency of the air conditioner.

Additionally, after the humidifying device is mounted on the floor-standing air conditioner, it is very inconvenient to regulate the floor-standing air conditioner when there is no humidification demand in related art.

SUMMARY

The present invention aims at solving at least one of the technical problems in prior art. For this purpose, the present invention provides a floor-standing air conditioner, the floor-standing air conditioner may achieve multiple modes of air discharge, such as non-humidified air discharge and humidified air discharge (including various kinds of discharged air with different humidifying capacity), thus promoting users' experience.

A floor-standing air conditioner according to embodiments of the present invention includes: a body, where a body air inlet and a body air outlet are formed on the body, an air duct assembly, where the air duct assembly is disposed on the body and comprises a fan, the fan has a fan air inlet and a fan air outlet, and the fan air inlet communicates with the body air inlet, a water container, where the water container is disposed on the air duct assembly, and a water tank and a humidification component are disposed inside the water container, and an air duct switching component, where the air duct switching component comprises an air outlet cover and an air switching plate, and an air inlet, a first air outlet and a second air outlet spaced apart from each other are formed on the air outlet cover; the air inlet communicates with the fan air outlet, and the air switching plate is disposed on the air outlet cover; the air switching plate may move between a first position where the first air outlet is closed and the second air outlet is opened and a second position where the first air outlet is opened and the second air outlet is closed, when the air switching plate closes one of the first air outlet and the second air outlet, the air inlet communicates with the body air outlet via another one of the first air outlet and the second air outlet, where the humidification component is disposed on the first air outlet.

A floor-standing air conditioner according to the embodiments of the present invention, the air duct switching component is arranged at the fan air outlet of the air duct assembly, such that a position of the air switching plate is adjusted to adjust an airflow path and humidified or non-humidified air is discharged from the floor-standing air conditioner, moreover, the humidity of the discharged air from the floor-standing air conditioner may be adjusted according to users' demands, thus improving users' experience.

According to some embodiments of the present invention, the water container may be disposed on the air duct assembly in a push-pull way, where the water tank and the humidification component may be detachably disposed inside the water container.

According to some embodiments of the present invention, the water container may be detachably disposed on the air duct assembly.

According to some embodiments of the present invention, the water container and the air duct switching component are disposed on a top of the air duct assembly, the fan air outlet is formed on a top of the fan, the air inlet is formed at the bottom of the air outlet cover to be connected with the fan air outlet, the first air outlet is formed on a side wall of the air outlet cover and arranged vertically, and the second air outlet is formed on the top of the air outlet cover and arranged slantwise relative to the first air outlet.

According to some embodiments of the present invention, the water tank is located at one side of the humidification component away from the first air outlet and is spaced apart from the humidification component.

According to some embodiments of the present invention, one end of the second air outlet is adjacent to an upper end of the first air outlet, another end of the second air outlet slantwise extends downwards away from the first air outlet.

According to some embodiments of the present invention, one end of the air switching plate is located between the one end of the second air outlet and the upper end of the first air outlet as well as is pivotally connected with the air outlet cover.

According to some embodiments of the present invention, the air outlet cover is provided with a motor, and the motor is connected with the one end of the air switching plate, so as to drive the air switching plate to rotate between the first position and the second position.

According to some embodiments of the present invention, the humidification component is a wet film.

Additional aspects and advantages of the present invention will be given in the following description, some of which will be apparent from the following description or be appreciated from practices of the present invention.

BRIEF DESCRIPTION OF THE DRAWINGS

The above and/or additional aspects and advantages of the present invention will be apparent and easily understood in the description of embodiments with reference to the following drawings, where.

Figure 1:
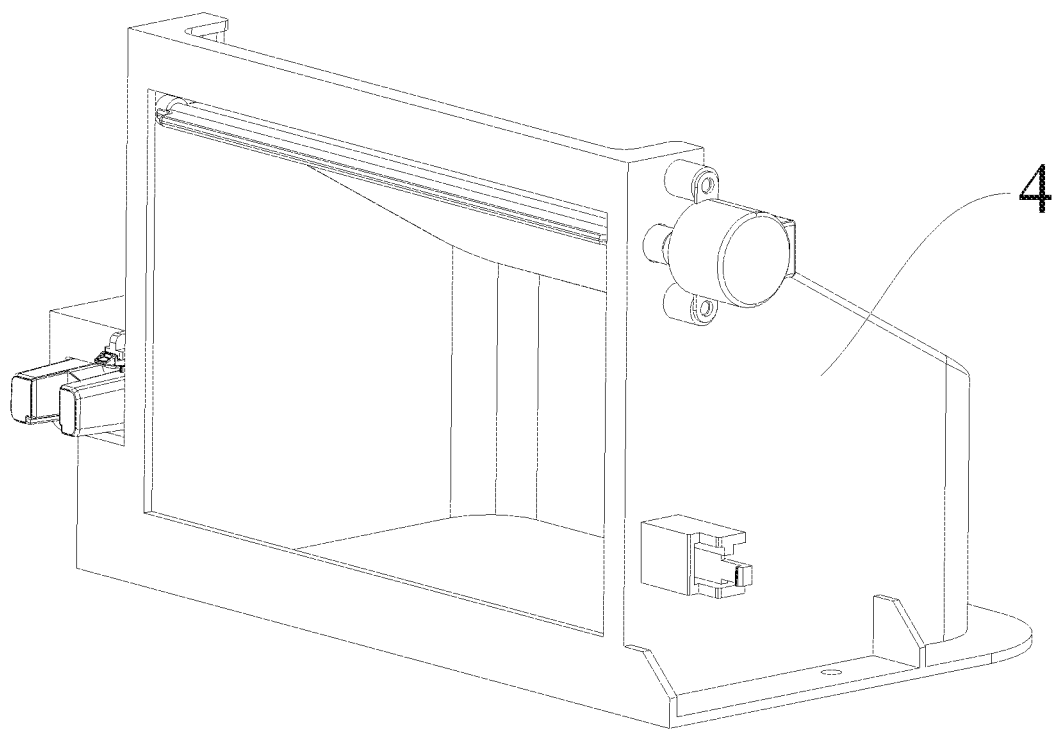
FIG. 1 is a schematic diagram showing a structure of an air duct switching component according to embodiments of the present invention.

Reference numerals: floor-standing air conditioner 1000, air handling device 100, body 1, body air inlet 11, body air outlet 12, air duct assembly 2, fan 21, fan air inlet 211, fan air outlet 212, water container 3, water tank 31, humidification component 32, air duct switching component 4, air outlet cover 41, air inlet 411, first air outlet 412, second air outlet 413, air switching plate 42, motor 43, water level detection unit 44, purification device 200, indoor heat exchange device 300, heat exchanger 320, indoor heat exchange fan 310.

DETAILED DESCRIPTION

The embodiments of the present invention are described in detail below. Examples of the embodiments are shown in the drawings. Same numerals throughout denote same or similar elements or the elements having same or similar functions. The following embodiments described with reference to the drawings are illustrative and only used to explain the present invention, but should not be interpreted as the restrictions of the present invention.

In the description of the present invention, it will be appreciated that terms "center", "longitudinal", "lateral", "length", "width", "thickness", "upper", "lower", "front", "back", "left", "right", "vertical", "horizontal", "top", "bottom", "inside", "outside", "clockwise", "anticlockwise", "axial", "radial", "circumferential" and other indicative directional or positional relation are the directional or positional relation based on the drawings, which is only intended to describe the present invention and simplify the description for convenience, but not to denote or hint that the indicated device or element must possess a specific direction, be constructed and operated in a specific direction, therefore, it should not be construed to limit the present invention. In addition, the features defining "first" and "second" may explicitly denote or impliedly include one or more of these features. In the description of the present invention, unless otherwise specified, "a plurality of" means two or more.

In the description of the present invention, it should be noted that unless otherwise stipulated and defined explicitly, terms "mount", "link", "connect" should be regarded as general understanding, e.g., permanent connection, detachable connection, or integrated connection are available; both mechanical connection and electric connection are also available; direct link, indirect link by media, or inner communication between two element are available. Those ordinary skilled in the art may understand the specific meanings of the above terms in the present invention according to particular situations.

A floor-standing air conditioner 1000 according to embodiments of the present invention will be described with reference to FIG. 1-FIG. 11. The floor-standing air conditioner 1000 may be an air conditioner with cooling function only. The floor-standing air conditioner 1000 may be also an air conditioner with cooling and heating functions certainly, namely, a cooling and heating machine. In the description of the application below, the floor-standing air conditioner 1000, a cooling and heating machine, is set as an example for description.

As shown in FIG. 1-FIG. 11, the floor-standing air conditioner 1000 according to embodiments of the present invention, e.g., a cooling and heating machine includes a body 1, an air duct assembly 2, a water container 3 and an air duct switching component 4.

Figure 4:
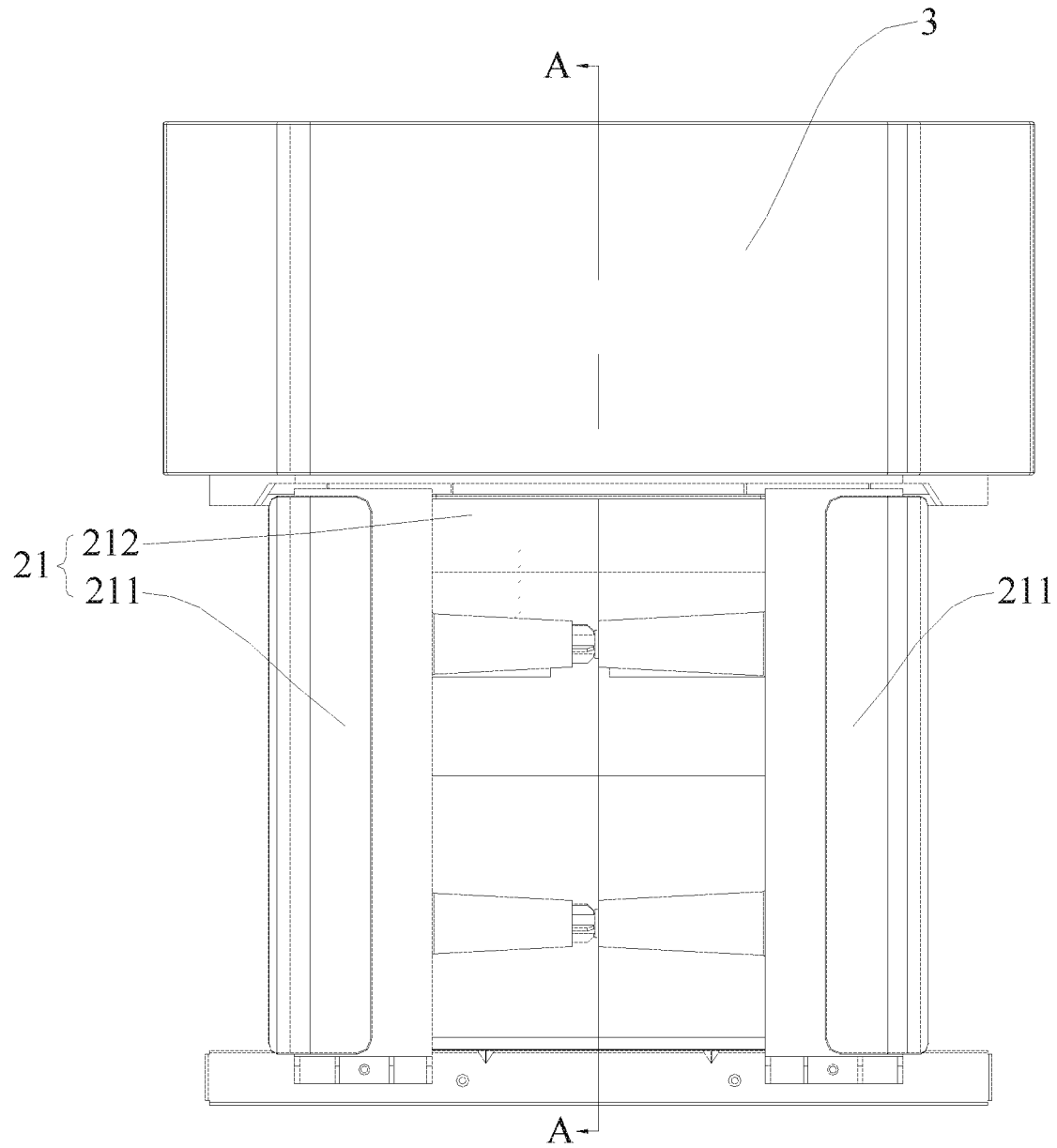
FIG. 4 is a front view of the air duct assembly, water container and the air duct switching component according to embodiments of the present invention.
Figure 11:
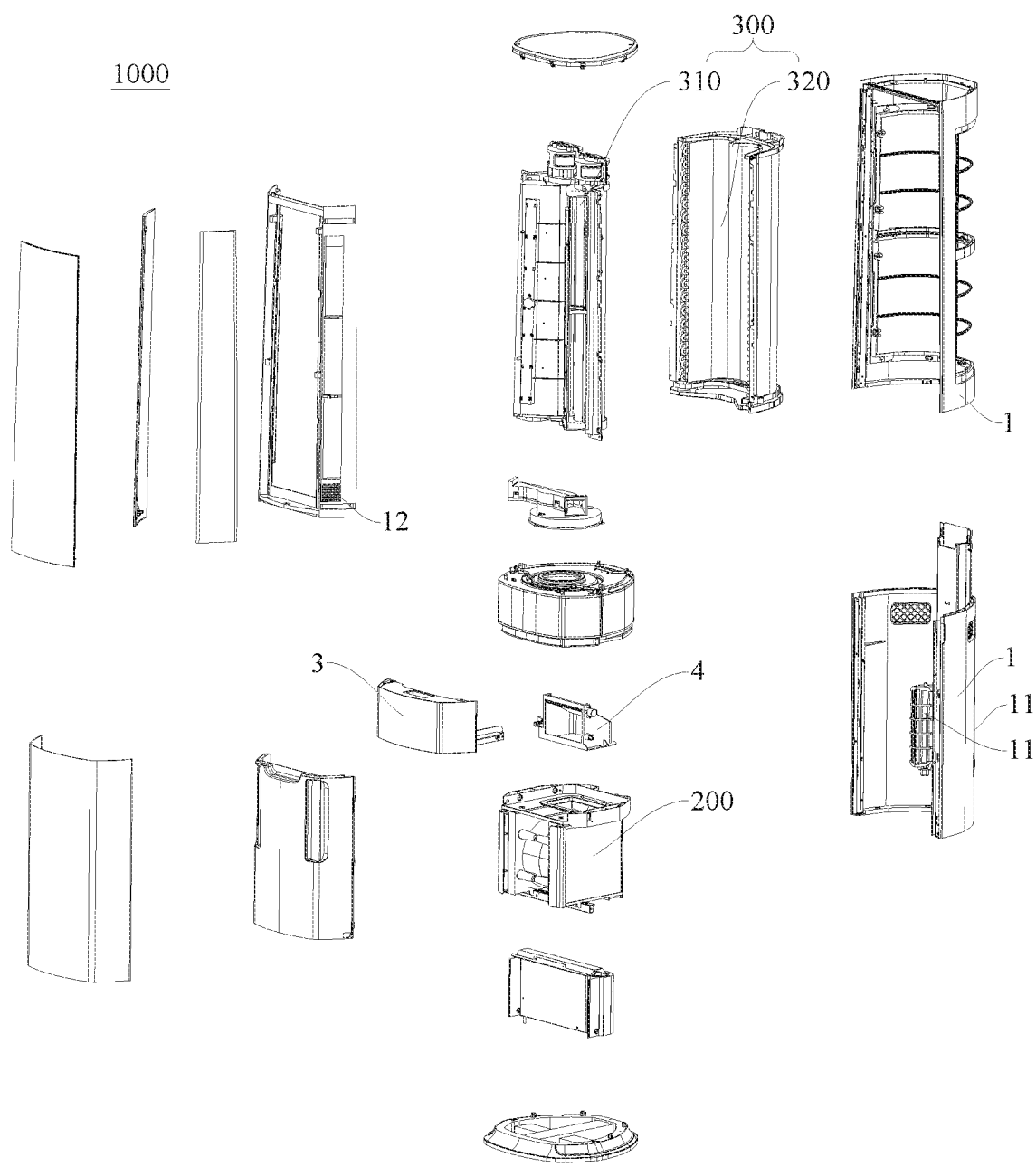
FIG. 11 is an explosive view of the floor-standing air conditioner according to embodiments of the present invention.

As shown in FIG. 4 and FIG. 11, a body air inlet 11 and a body air outlet 12 are formed on the body 1, an air duct assembly 2 is disposed on the body 1 and comprises a fan 21, the fan 21 has a fan air inlet 211 and a fan air outlet 212, and the fan air inlet 211 communicates with the body air inlet 11, so that the fan air inlet 211 may intake air from the body air inlet 11.

As shown in FIG. 1-FIG. 8, a water container 3 is disposed on the air duct assembly 2, and a water tank 31 and a humidification component 32 (also referred to as a humidifier) are disposed inside the water container 3. An air duct switching component 4 includes an air outlet cover 41 and an air switching plate 42, and an air inlet 411, a first air outlet 412 and a second air outlet 413 spaced apart from each other are formed on the air outlet cover 41; the air inlet 411 communicates with the fan air outlet 212, and the air switching plate 42 is disposed on the air outlet cover 41; the air switching plate 42 may move between a first position where the first air outlet 412 is closed and the second air outlet 413 is opened and a second position where the first air outlet 412 is opened and the second air outlet 413 is closed. When the air switching plate 42 closes one of the first air outlet 412 and the second air outlet 413, the air inlet 411 communicates with the body air outlet 12 via another one of the first air outlet 412 and the second air outlet 413, where the humidification component 32 is disposed on the first air outlet 412.

Figure 5:
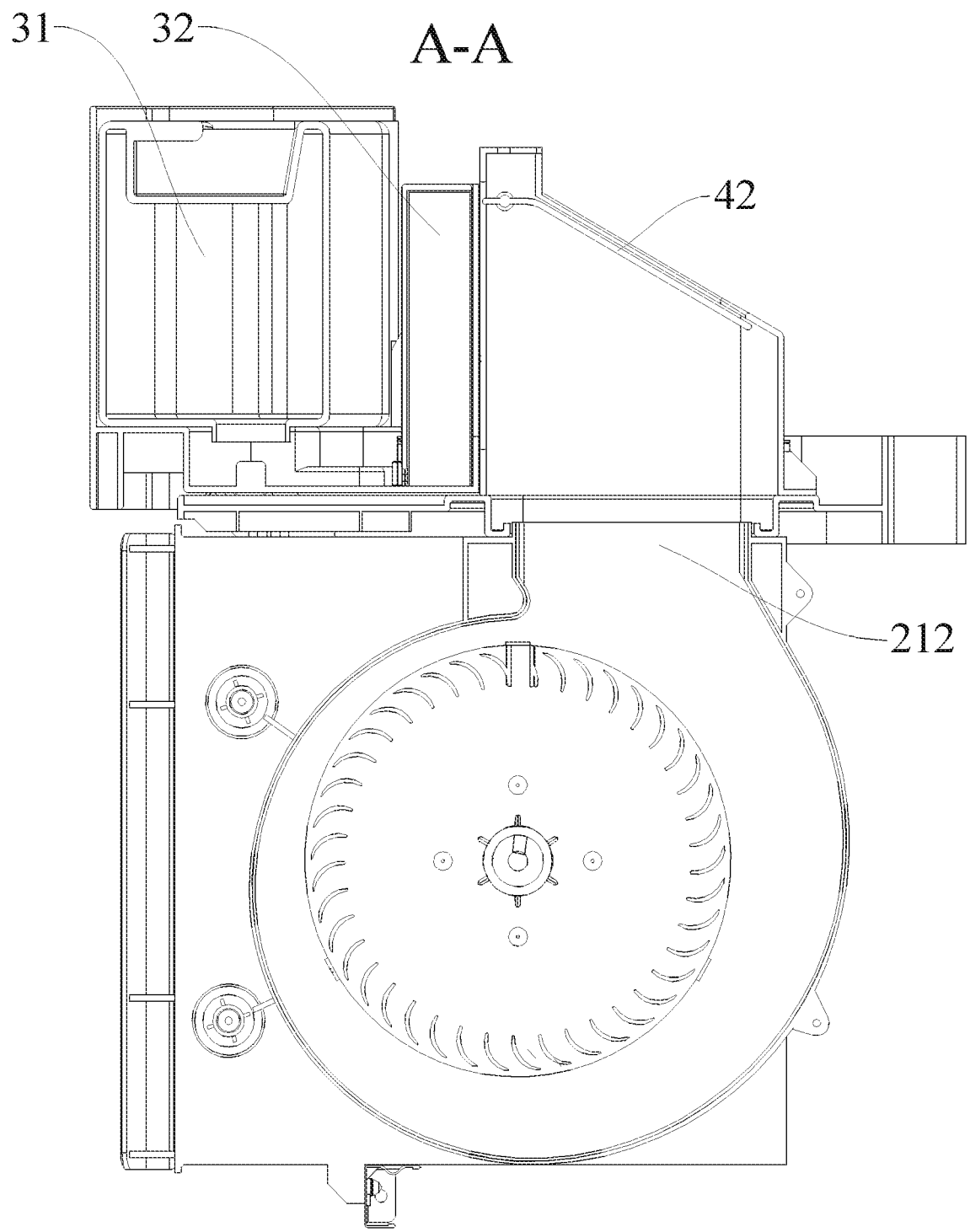
FIG. 5 is a schematic diagram showing a cross section along with line A-A of FIG. 4.
Figure 6:
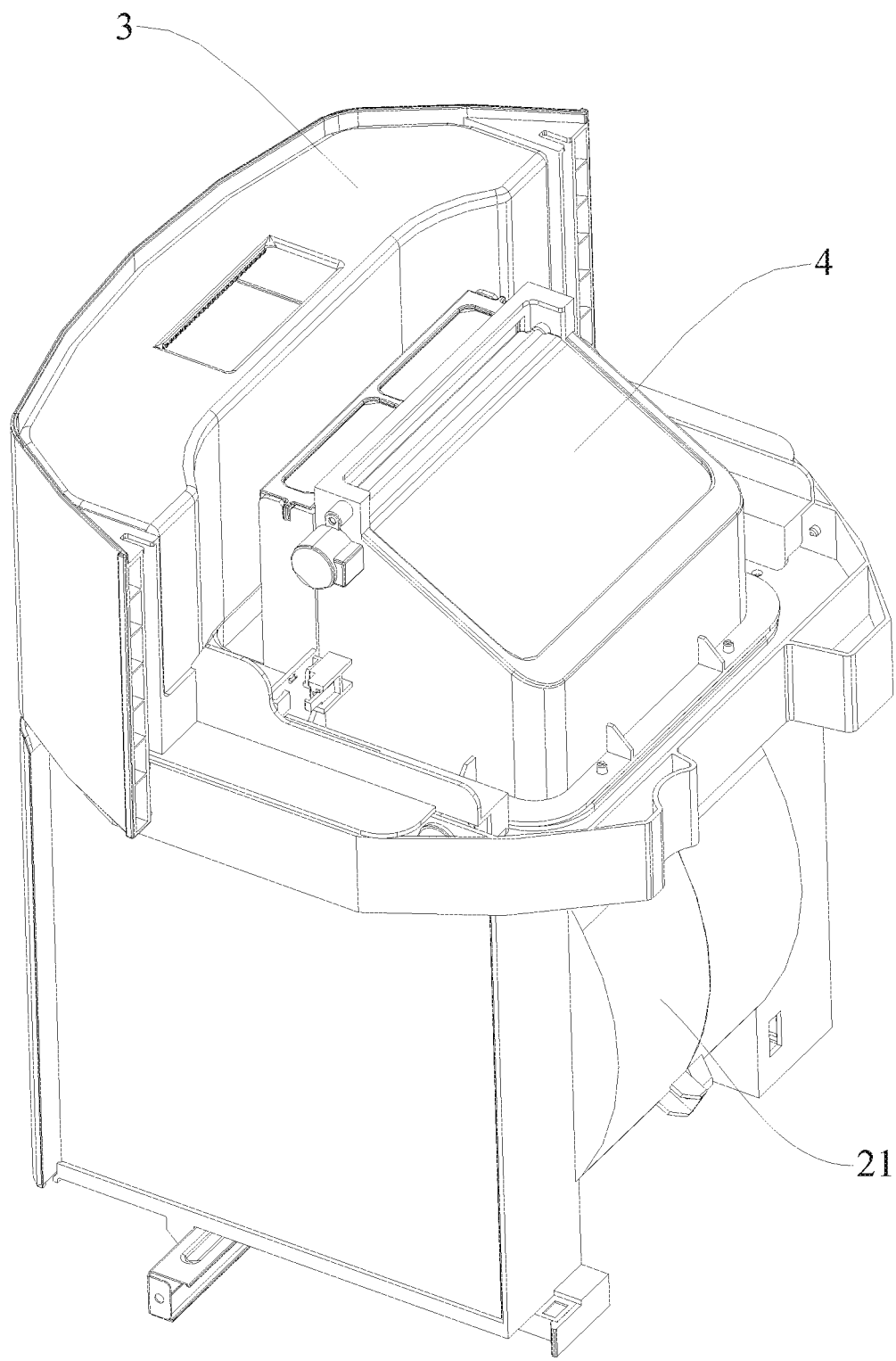
FIG. 6 is a perspective view of the air duct assembly, water container and the air duct switching component according to embodiments of the present invention.
Figure 7:
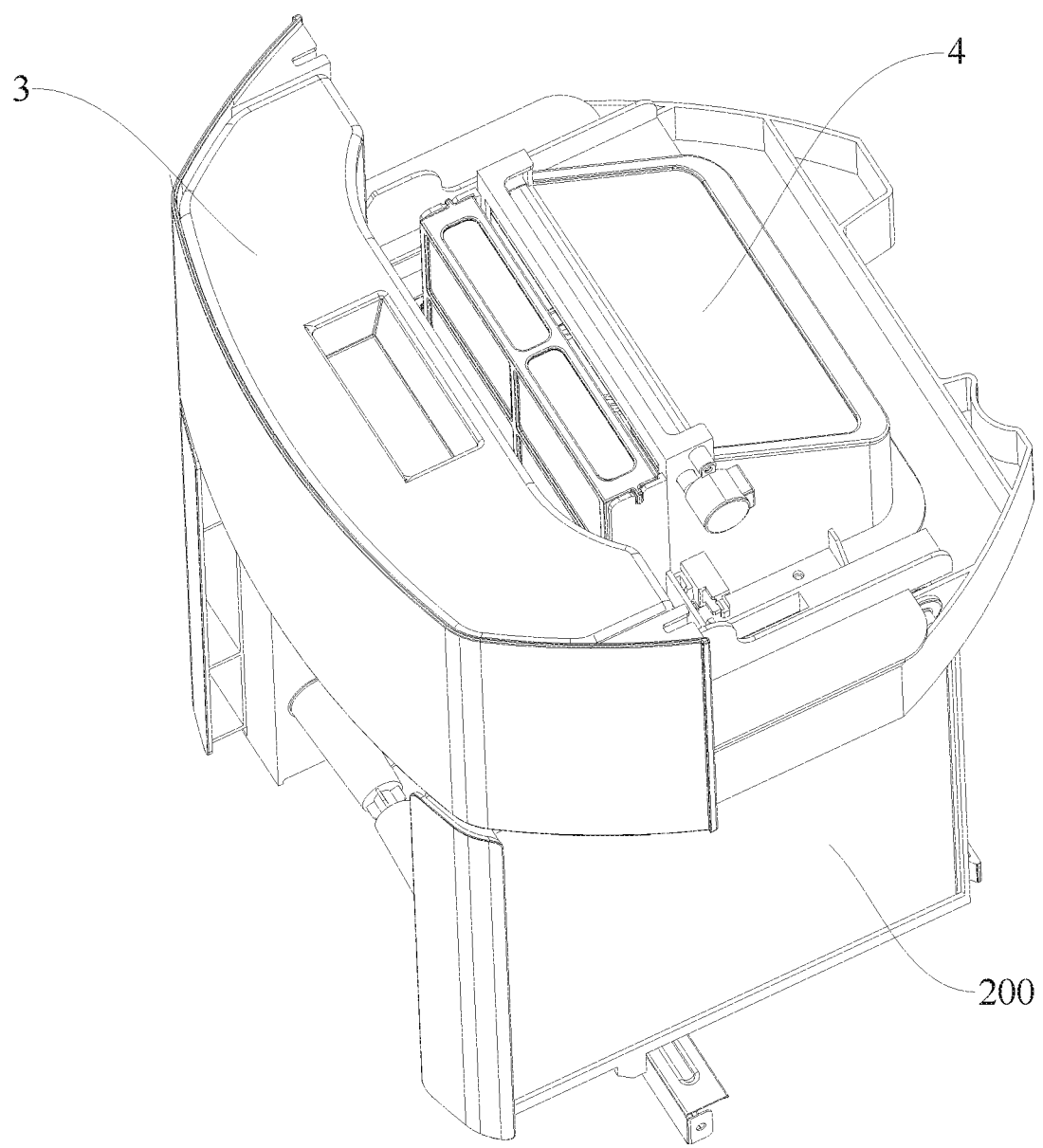
FIG. 7 is a schematic diagram showing structures of the air duct assembly, water container and the air duct switching component from another angle of view according to embodiments of the present invention.
Figure 8:
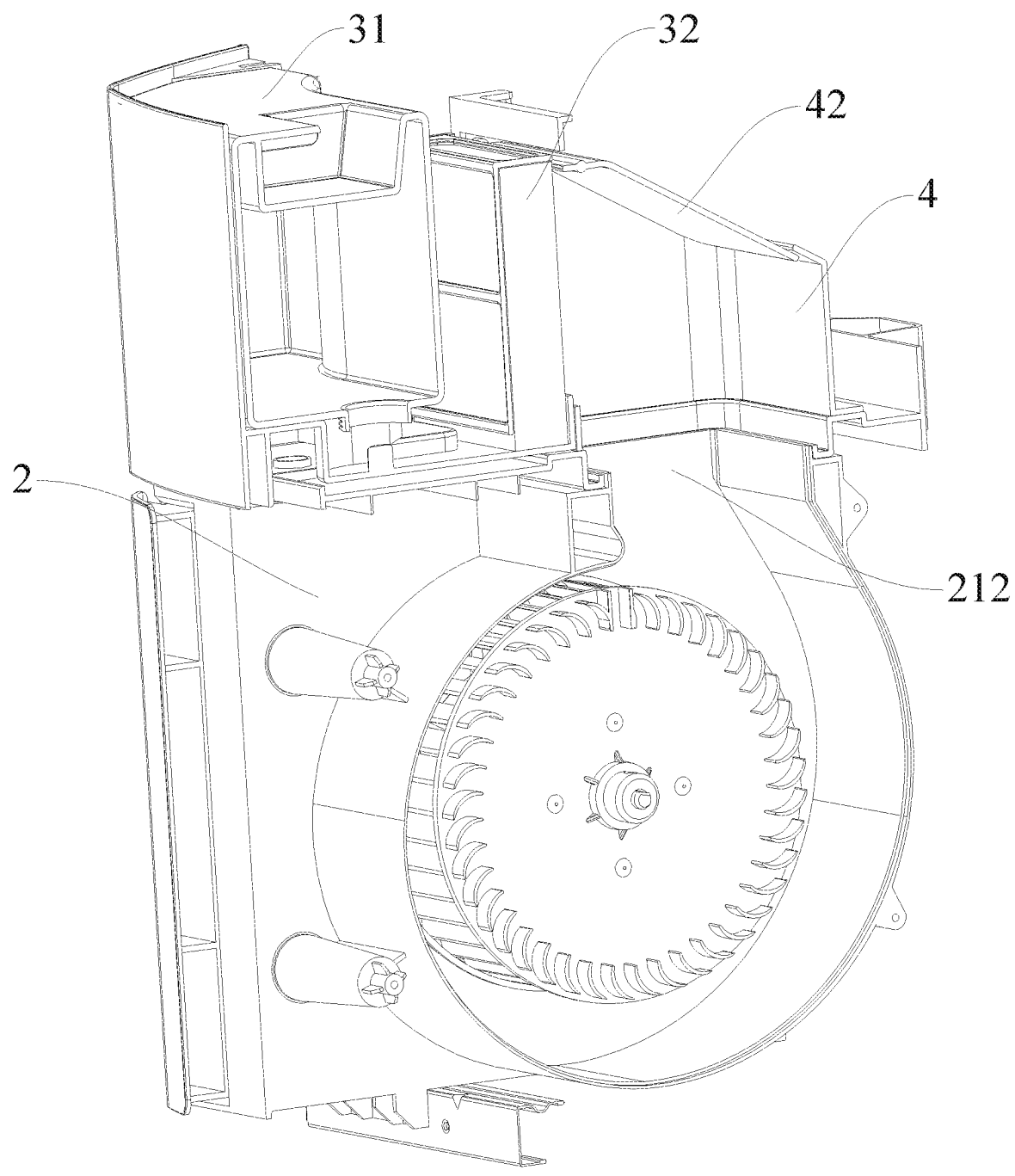
FIG. 8 is a sectional view of the air duct assembly, water container and the air duct switching component according to embodiments of the present invention.

It should be noted that the first position is a position status (not as shown in the figure) where the first air outlet 412 is closed by the air switching plate 42 and airflow is suitable for flowing to the body air outlet 12 via the second air outlet 413, and the second position is a position status (as shown in FIG. 1 and FIG. 5) where the second air outlet 413 is closed by the air switching plate 42 and airflow is suitable for flowing to the body air outlet 12 by the first air outlet 412. The air switching plate 42 may move back and forth between the first position and the second position, moreover, may keep still at anywhere between the first position and the second position according to requirements. At this time, airflow may discharge from both sides of the air switching plate 42, namely, partial airflow flows out of the first air outlet 412, and another airflow flows out of the second air outlet 413.

The water tank 31 may store a certain amount of liquid, e.g., water, etc., so that airflow may be humidified while flowing through the humidification component 32. The air inlet 411 communicates with the body air outlet 12 via the second air outlet 413, and airflow flows out of the second air outlet 413 when the first air outlet 412 is completely closed by the air switching plate 42 (namely, the air switching plate 42 is located in the first position), at this time, the airflow is not humidified by the humidification component 32 as not flow therethrough; when the second air outlet 413 is completely closed by the air switching plate 42 (namely, the air switching plate 42 is located in the second position), the air inlet 411 communicates with the body air outlet 12 by the first air outlet 412, and airflow flows out of the first air outlet 412, furthermore, the airflow is humidified by the humidification component 32 when flow therethrough; when the air switching plate 42 is located between the first position and the second position (exclusive of the above first position and the second position), airflow may flow out of the first air outlet 412 and the second air outlet 413, and at this time, partial airflow from the first air outlet 412 is only humidified, which achieves the purpose of airflow humidification similarly as well.

Therefore, airflow flows out of the second air outlet 413 and is not humidified when the air switching plate 42 is located in the first position, the floor-standing air conditioner 1000 may achieve non-humidified air discharge; when the air switching plate 42 is located in the second position, airflow may only flow out of the first air outlet 412 and is humidified by the humidification component 32 at this time and the floor-standing air conditioner 1000 may achieve humidified air discharge with the maximum humidifying capacity; when the air switching plate 42 is located between the first position and the second position, the floor-standing air conditioner 1000 may also achieve humidified air discharge, and at this time, the specific humidity of the discharged air may be adjusted according to actual demands accordingly. Here it should be noted that the humidification component 32 may be not only used to humidify the airflow flowing therethrough (e.g., air, etc.), but also have a cleaning function, specifically, the humidification component 32 may precipitate particulate matters in the air, thus refreshing the air.

It is appreciated that when the air switching plate 42 is located between the first position and the second position, the smaller the included angle between the air switching plate 42 and the plane of the first position is, the lower the humidity of the discharged air in the floor-standing air conditioner 1000 is; the larger the included angle between the air switching plate 42 and the plane of the first position is, the higher the humidity of the discharged air from the floor-standing air conditioner 1000 is.

According to the floor-standing air conditioner 1000 of embodiments of the present invention, the air duct switching component 4 is arranged in the fan air outlet 212 of the air duct assembly 2 and the humidification component 32 is arranged in the first air outlet 412 of the air duct switching component 4, such that a position of the air switching plate 42 is adjusted to adjust an airflow path and humidified or non-humidified air is discharged from the floor-standing air conditioner 1000, moreover, the humidity of the discharged air from the floor-standing air conditioner 1000 may be adjusted according to users' demands, thus improving users' experience.

Figure 3:
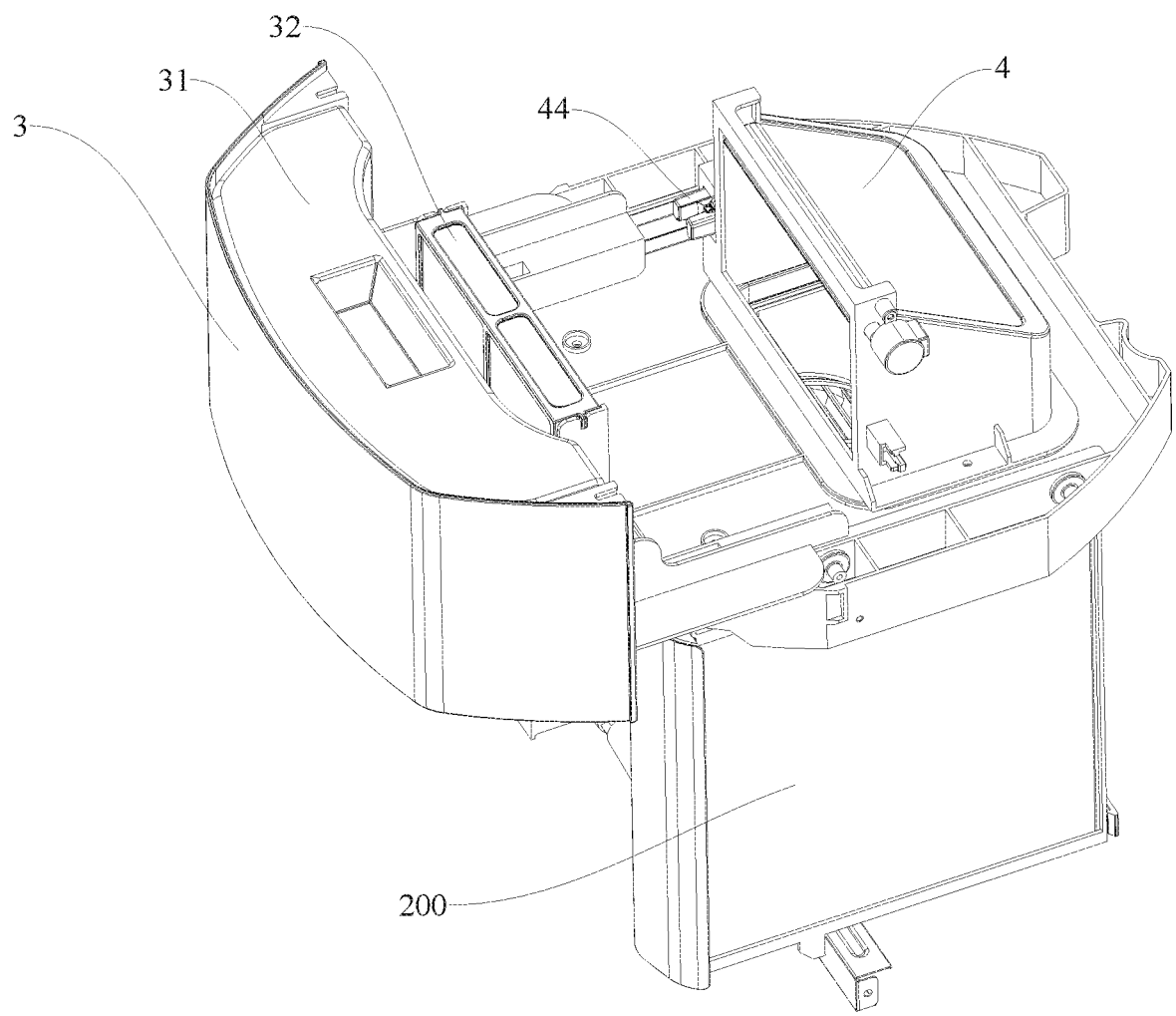
FIG. 3 is a schematic diagram showing structures of an air duct assembly, a water container and an air duct switching component according to embodiments of the present invention, where the water container is pulled out from the air duct assembly.

As shown in FIG. 3, in some embodiments of the present invention, the water container 3 may be disposed on the air duct assembly 2 in a push-pull way, where the water tank 31 and the humidification component 32 may be detachably disposed inside the water container 3. Specifically, for example, the water container 3 may be pulled forward from the air duct assembly 2 (as shown in FIG. 3). At this time, the water tank 31 may be taken out of the water container 3, so that liquid, e.g., water, etc. is added to the water tank 31, and moreover, in case that the humidification component 32 is aging or fails, the humidification component 32 may be disassembled for replacement. The water container 3 may be pushed back to the right above of the air duct assembly 2 when there is enough water in the water tank 31, namely, the status of not pulling the water container 3 (refer to FIG. 5), therefore, it is easy and simple to handle, and it has reasonable layout.

Figure 9:
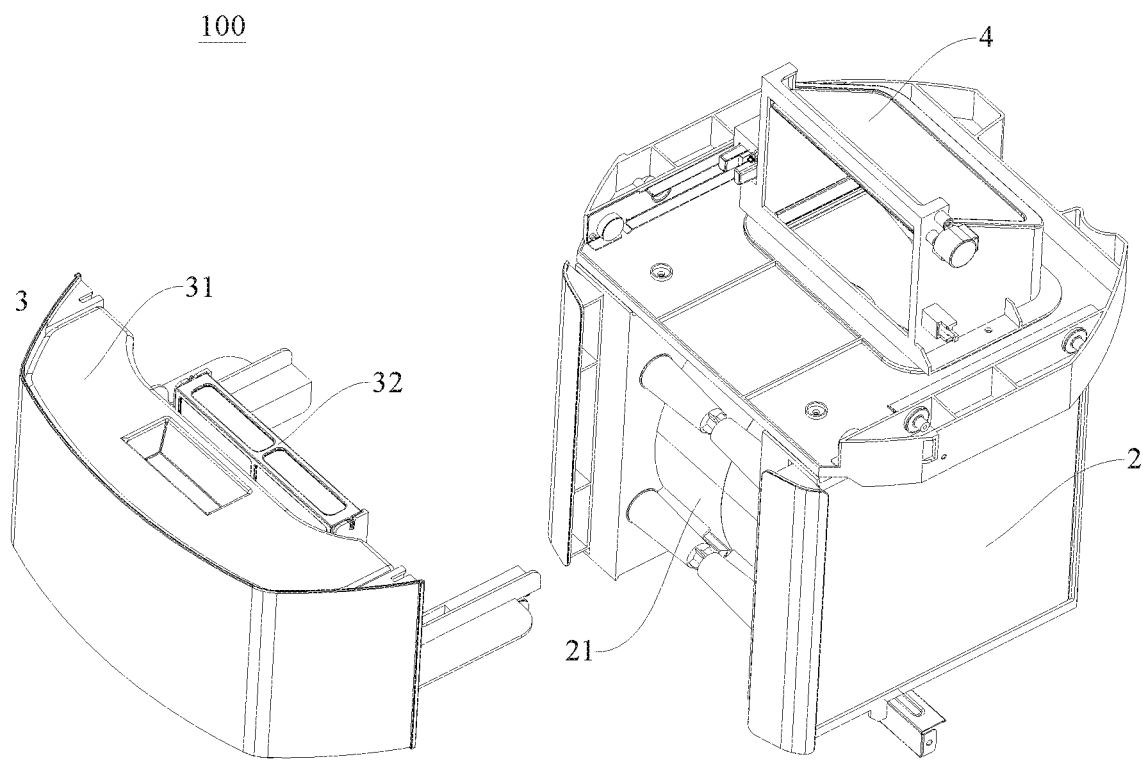
FIG. 9 is a schematic diagram showing structures of the air duct assembly, water container and the air duct switching component according to embodiments of the present invention, where the water container separates from the air duct assembly and air duct switching component.

As shown in FIG. 9, in some embodiments of the present invention, the water container 3 is detachably disposed on the air duct assembly 2. FIG. 9 shows a status of taking the water container 3 out of the air duct assembly 2, so as to be convenient for the supplementation of the water in the water tank 31, and for the cleaning of the water container 3. This arrangement allows for the water container 3 to be easy to handle.

As shown in FIG. 3-FIG. 9, in the floor-standing air conditioner 1000 of some embodiments of the present invention, the water container 3 and the air duct switching component 4 are disposed on the top of the air duct assembly 2, the fan air outlet 212 is formed on the top of the fan 21, the air inlet 411 is formed at the bottom of the air outlet cover 41 to be connected with the fan air outlet 212, the first air outlet 412 is formed on a side wall of the air outlet cover 41 and arranged vertically, and the second air outlet 413 is formed on the top of the air outlet cover 41 and arranged slantwise relative to the first air outlet 412. Thus, the layout among the water container 3, air duct switching component 4 and the fan 21 is more reasonable, moreover, the airflow has a shorter path, small flow loss and low noise in the process of flowing through the air duct switching component 4 from the fan 21.

It is appreciated that as shown in FIG. 3 and FIG. 9, when the water container 3 is taken out, the first air outlet 412 is open and the fan 21 communicates with the outside at this time, dust and other pollutants easily invade into the fan 21, the position of the air switching plate 42 is adjusted, e.g., the air switching plate 42 is switched to the first position to shield the first air outlet 412, so that the fan 21 may be protected by the air duct switching component 4, which effectively prevents dust, etc. from entering into the fan 21 via the air duct switching component 4, thus ensuring a clean airflow path, guaranteeing normal operation of the fan 21 and extending the service life of the fan 21.

As shown in FIG. 5-FIG. 8, further, the water tank 31 is located at one side of the humidification component 32 away from the first air outlet 412 and is spaced apart from the humidification component 32, thus guaranteeing the volume of the airflow while flowing through the humidification component 32, achieving a more compact structure between the water container 3 and the air duct switching component 4 as well as achieving a more reasonable layout among components.

As shown in FIG. 5, one end (e.g., a left end in FIG. 5) of the second air outlet 413 is adjacent to an upper end of the first air outlet 412, another end (e.g., a right end in FIG. 5) of the second air outlet 413 slantwise extends downwards away from the first air outlet 412. The configuration of the structure may effectively save the space occupied by the air duct switching component 4, and decrease the included angle between the plane of the first air outlet 412 and the plane of the second air outlet 413, which facilitates the outflow of the airflow from the air duct switching component 4, thus achieving the switch of airflow humidification status better, namely, the switch of the air discharge modes (humidified or non-humidified) can be achieved via rotating a smaller angle of the air switching plate 42 only; meanwhile, the structure is simple and has more reasonable layout.

As shown in FIG. 3 and FIG. 5, in some embodiments of the present invention, one end of the air switching plate 42 is located between the one end of the second air outlet 413 and the upper end of the first air outlet 412, moreover, the above one end of the air switching plate 42 is pivotally connected with the air outlet cover 41. The connection mode is simple, and the air switching plate 42 may be rotated to different angles conveniently, thus adjusting the mode of air discharge from the floor-standing air conditioner 1000.

Figure 2:
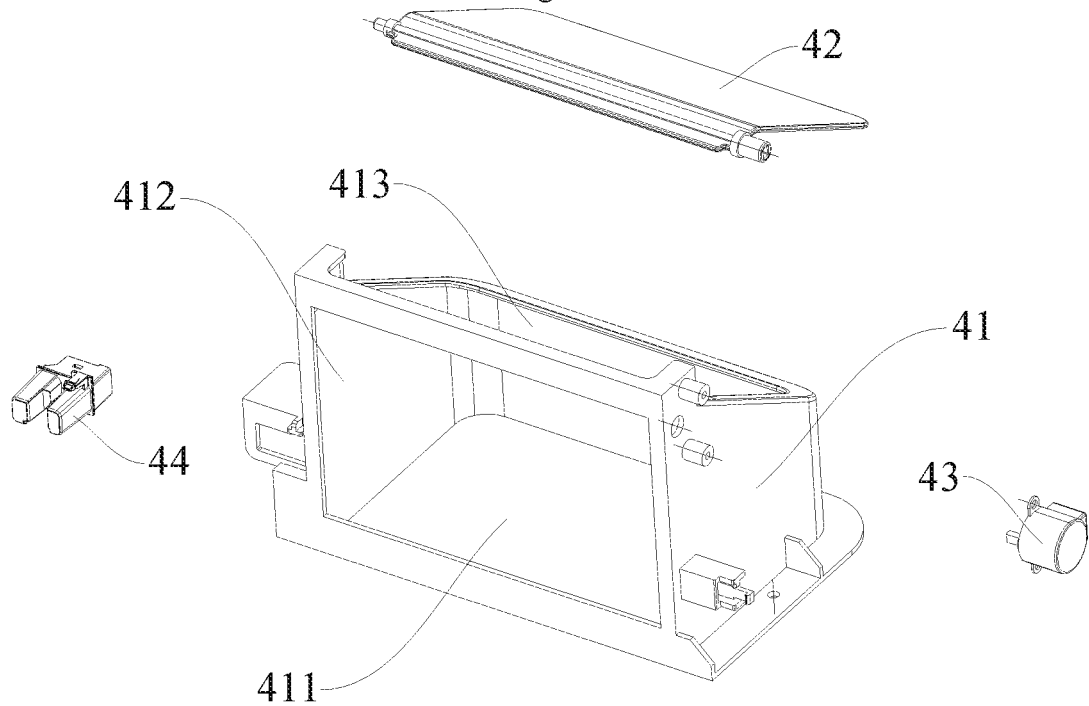
FIG. 2 is an explosive view of the air duct switching component according to embodiments of the present invention.

Referring to FIG. 1 and FIG. 2, further, the air outlet cover 41 is provided with a motor 43, and the motor 43 is connected with the one end of the air switching plate 42, so as to drive the air switching plate 42 to rotate between the first position and the second position, which is easy to drive the air switching plate 42 for rotation accordingly. Moreover, the mode is simple and reliable.

Optionally, the humidification component 32 is a wet film, the wet film may absorb water from the water container, thus ensuring that the humidification component 32 is in a humidification status, and when air flows through the wet film, the wet film may precipitate particles in the air, thus keeping good humidification effect and refreshing air. The wet film may be prepared by adding special chemical raw materials to plant fiber or glass fiber, and it has good water absorption and evaporability.

It is appreciated that the humidification component 32 may be periodically taken out for cleaning and replacement, thus guaranteeing good humidification effect and air refreshing effect.

Figure 10:
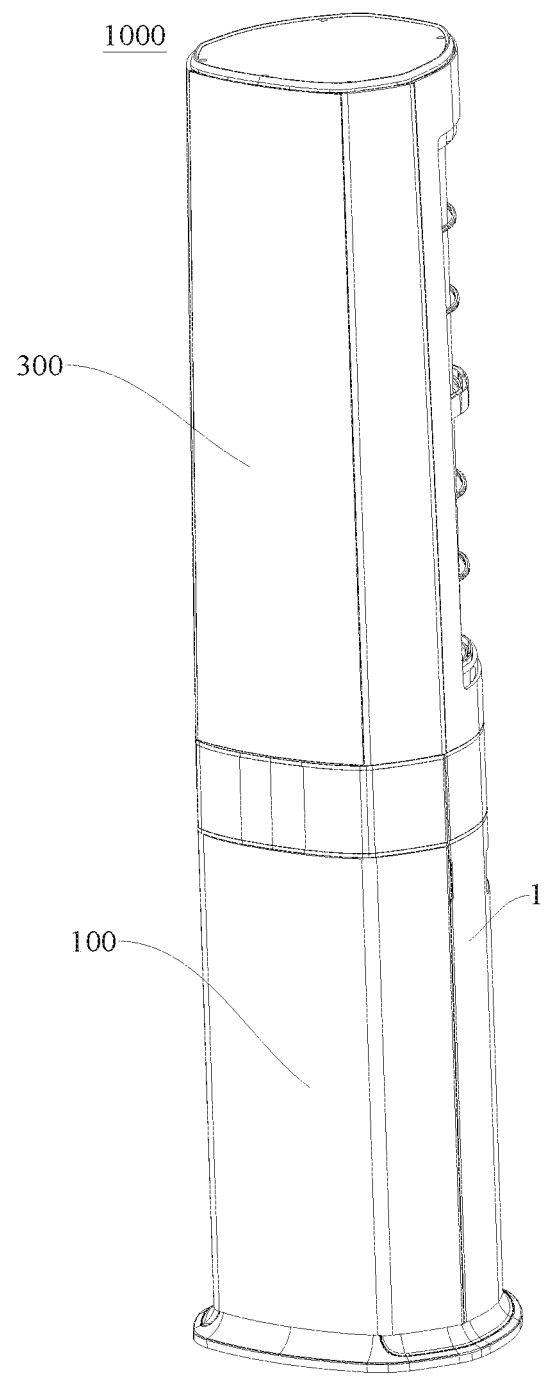
FIG. 10 is a schematic diagram showing a structure of a floor-standing air conditioner according to embodiments of the present invention.

Optionally, referring to FIG. 10 and FIG. 11, the fan air inlet 211 may be further provided with a purification device 200, and at this time, the purification device 200 may be disposed upstream of the fan 21; the purification device 200 may purify and filter the air flowing into the fan 21 well, thus purifying the air and improving users' experience. Here it should be noted that the "upstream" may be construed as the upstream of the flow direction of airflow respectively.

As shown in FIG. 10 and FIG. 11, the floor-standing air conditioner 1000 includes an indoor heat exchange device 300 and an air handling device 100, and the air handling device 100 may be disposed below the indoor heat exchange device 300. The air handling device 100 may be further disposed above the indoor heat exchange device 300 (not as shown in the figure) certainly. The air handling device 100 includes the above air duct assembly, water container, air duct switching component, etc., thus humidifying the airflow flowing therethrough (e.g., air, etc.). Further, the purification device 200 may be arranged upstream of the fan air inlet of the fan, thus humidifying the airflow flowing therethrough (e.g., air, etc.).

The indoor heat exchange device 300 is used to cool or warm the airflow (e.g., air, etc.) flowing through the indoor heat exchange device 300, thus achieving the purpose of refrigerating or heating. The indoor heat exchange device 300 may have cooling function only, of course have refrigerating or heating functions at the same time. The indoor heat exchange device 300 may include a heat exchanger 320, an indoor heat exchange fan 310, etc. It is appreciated that the concrete structure and working principle of the indoor heat exchange device 300 have been well known to those skilled in the art, and thus will not be described in detail here.

The working process of a floor-standing air conditioner 1000 in one embodiment of the present invention is described in detail with reference to FIG. 1-FIG. 11:

Air flows into a body 1 via a body air inlet 11 and the body air inlet 11 communicates with a fan air inlet 211 when the floor-standing air conditioner 1000 works. Air enters into a fan 21 via the fan air inlet 211 and is purified by a purification device 200 at the fan air inlet 211, thus improving the air quality of the fan 21, protecting the fan 21 and extending the service life of the fan 21.

Under the action of the fan 21, air flows out of a fan air outlet 212, and the fan air outlet 212 communicates with an air inlet 411 of an air duct switching component 4. At this time, a position of an air switching plate 42 in the air duct switching component 4 may be adjusted according to user's actual demands, e.g., the air switching plate 42 may be adjusted between the first position and the second position, or in the second position when the floor-standing air conditioner 1000 is required to discharge humidified air, and when the air switching plate 42 is located in the second position, the humidifying effect is up to the maximum. When the air switching plate 42 is adjusted between the first position and the second position, the air gathers after flowing out of the first air outlet 412 and the second air outlet 413, and flows to the body air outlet 12 through an airflow path, thus flowing out of the body air outlet 12. The rotating angle of the air switching plate 42 may be adjusted according to the user's demand for the humidity of the discharged air from the floor-standing air conditioner 1000.

The air switching plate 42 may be adjusted to the first position, namely, the first air outlet 412 is closed when the floor-standing air conditioner 1000 is not requested to discharge humidified air. Thus, different humidity of air may be discharged and the air is purified, thus improving users' experience.

In the description of the specification, terms "one embodiment", "some embodiments", "schematic embodiment", "example", or "some examples" and other description denote a specific feature, structure, material or characteristic described with reference to the embodiment or example, which are included in at least one embodiment or example of the present invention. In the specification, schematic expression of the above terms does not always refer to a same embodiment or example. Moreover, the specific feature, structure, material or characteristic described may be appropriately combined in any one or more embodiments or examples.

Although embodiments of the present invention have been indicated and described, it can be understood for those ordinary skill in the art that: various changes, modifications, substitutions and variations of these embodiments may be made within the principle and spirit of the present invention, and the scope of the present invention is limited by claims and equivalents thereof.

What is claimed is:

1. A floor-standing air conditioner comprising:
a body, wherein the body defines a body air inlet and a body air outlet;
an air duct assembly comprising a fan,
wherein the air duct assembly defines a fan air inlet and a fan air outlet,
wherein the fan air outlet is formed on a top of the fan, and
wherein the air duct assembly is configured to be disposed on the body such that the fan air inlet communicates with the body air inlet;
a liquid tank and a humidifier configured to be disposed inside the liquid container; and
an air duct switching component comprising:
an air outlet cover,
wherein the air outlet cover defines an air inlet, a first air outlet and a second air outlet, spaced apart from each other,
wherein the air inlet is defined at a bottom of the air outlet cover,
wherein the first air outlet is defined on a side wall of the air outlet cover and arranged vertically, and the second air outlet is defined on a top of the air outlet cover and arranged slantwise relative to the first air outlet, and
wherein the air outlet cover is arranged relative to the air duct assembly such that the air inlet communicates with the fan air outlet; and
an air switching plate disposed on the air outlet cover,
wherein the air switching plate is configured to move between a first position to close the first air outlet and to open the second air outlet and a second position to open the first air outlet and to close the second air outlet.

2. The floor-standing air conditioner according to claim 1, wherein the liquid tank is located at one side of the humidifier away from the first air outlet and is spaced apart from the humidifier.

3. The floor-standing air conditioner according to claim 1, wherein one end of the second air outlet is adjacent to an upper end of the first air outlet, and wherein another end of the second air outlet slantwise extends downwards away from the first air outlet.

4. The floor-standing air conditioner according to claim 3, wherein one end of the air switching plate is located between the one end of the second air outlet and the upper end of the first air outlet, and
wherein the one end of the air switching plate is configured to be pivotally connected with the air outlet cover.

5. The floor-standing air conditioner according to claim 4, wherein the air duct switching component comprises a motor configured to be movably connected with the one end of the air switching plate, so as to drive the air switching plate to rotate between the first position and the second position.

6. The floor-standing air conditioner according to claim 1, wherein the humidifier comprises a wet film.

7. The floor-standing air conditioner according to claim 1, further comprising a liquid container configured to be disposed on the air duct assembly.

8. The floor-standing air conditioner according to claim 7, wherein the liquid container is configured to be movably disposed on the air duct assembly to be pushed toward and pulled away from the air duct assembly, and
wherein the liquid tank and the humidifier are configured to be detachably disposed inside the liquid container.

9. The floor-standing air conditioner according to claim 7, wherein the liquid container is configured to be detachably disposed on the air duct assembly.

10. The floor-standing air conditioner according to claim 7,
wherein the liquid container and the air duct switching component are disposed on a top of the air duct assembly such that the air inlet is connected with the fan air outlet.

11. The floor-standing air conditioner according to claim 1, wherein in the first position of the air switching plate, the fan air outlet communicates with the body air outlet via the air inlet and the second air outlet.

12. The floor-standing air conditioner according to claim 1, wherein the first air outlet is disposed relative to the humidifier such that in the second position of the air switching plate, the fan air outlet communicates with the body air outlet via the air inlet, the first air outlet and the humidifier.

* * * * *